(12) United States Patent
Davis

(10) Patent No.: US 8,099,548 B2
(45) Date of Patent: Jan. 17, 2012

(54) POWER EFFICIENT MEDIA PLAYBACK ON GENERAL PURPOSE PORTABLE DEVICES

(75) Inventor: Darren R. Davis, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 780 days.

(21) Appl. No.: 11/387,336

(22) Filed: Mar. 23, 2006

(65) Prior Publication Data

US 2007/0226417 A1 Sep. 27, 2007

(51) Int. Cl.
*G06F 12/00* (2006.01)
(52) U.S. Cl. ............. 711/113; 711/E12.006; 711/118; 711/152; 711/170
(58) Field of Classification Search ................ 711/118, 711/173, 171, 170, 172
See application file for complete search history.

(56) References Cited

U.S. PATENT DOCUMENTS

| | | | | |
|---|---|---|---|---|
| 4,633,387 A * | 12/1986 | Hartung et al. | ............... | 718/105 |
| 5,559,980 A * | 9/1996 | Connors et al. | ............... | 711/100 |
| 5,632,038 A | 5/1997 | Fuller | | |
| 5,636,355 A * | 6/1997 | Ramakrishnan et al. | ...... | 711/113 |
| 6,016,520 A | 1/2000 | Facq et al. | | |
| 6,052,822 A * | 4/2000 | Kim et al. | ...................... | 714/805 |
| 6,076,151 A * | 6/2000 | Meier | ........................... | 711/171 |
| 6,092,154 A | 7/2000 | Curtis et al. | | |
| 6,393,524 B1 * | 5/2002 | Ayers | ........................... | 711/133 |
| 7,136,874 B2 | 11/2006 | Mercer et al. | | |
| 2002/0180803 A1 | 12/2002 | Kaplan et al. | | |
| 2002/0198864 A1 | 12/2002 | Ostermann et al. | | |
| 2003/0088573 A1 | 5/2003 | Stickler | | |
| 2003/0172134 A1 | 9/2003 | Zervas et al. | | |
| 2003/0236906 A1 | 12/2003 | Klemets et al. | | |
| 2004/0199491 A1 | 10/2004 | Bhatt | | |
| 2004/0267774 A1 | 12/2004 | Lin et al. | | |
| 2005/0055337 A1 | 3/2005 | Bebo et al. | | |
| 2005/0066006 A1 * | 3/2005 | Fleck et al. | ................... | 709/206 |
| 2005/0066207 A1 | 3/2005 | Fleck et al. | | |
| 2005/0197924 A1 | 9/2005 | Janakiraman et al. | | |
| 2005/0204181 A1 | 9/2005 | Montero et al. | | |
| 2005/0216674 A1 | 9/2005 | Robbin et al. | | |
| 2005/0251696 A1 | 11/2005 | Cumpson et al. | | |
| 2006/0114832 A1 | 6/2006 | Hamilton et al. | | |
| 2007/0180066 A1 | 8/2007 | Sherwood et al. | | |

OTHER PUBLICATIONS

Cai et al., "A Survey of Low-power Multimedia Systems from the Prospective of Hardware/Software Codesign," http://www.shu.ac.uk/schools/research/mitri/crc/technical.reports/crc-95-3.abstract.html, printed Jan. 3, 2006, 16 pages.

Bai et al., "Reducing Issue Queue Power for Multimedia Applications using a Feedback Control Algorithm," http://www.lems.brown.edu/~yb/iccd04.pdf, printed Mar. 23, 2006, 4 pages.

Mohapatra, Shivajit et al., "Integrated Power Management for Video Streaming to Mobile Handheld Devices", Proceedings of the Eleventh ACM International Conference on Multimedia, Berkeley, CA, USA, Nov. 2-8, 2003, 10 pages.

* cited by examiner

*Primary Examiner* — Reginald Bragdon
*Assistant Examiner* — Victor Wang
(74) *Attorney, Agent, or Firm* — Senniger Powers LLP

(57) ABSTRACT

A portable multifunction computing device optimizes cache storage when processing media files and the like. During a playback operation, the device caches as many media items as possible such that during playback media items are retrieved from cache rather than from a hard disk memory. The device monitors memory requirements of other programs and applications currently in use on the device to insure sufficient cache memory is available for such programs and applications.

16 Claims, 10 Drawing Sheets

SEE FIG 3

POWER EFFICIENT MEDIA PLAYBACK ON GENERAL PURPOSE PORTABLE DEVICES

BACKGROUND

Portable computing devices are commonplace and widespread in their use. Some of these devices are capable of doing only a singular function, or fixed purpose. Most digital watches, for example, are only capable of performing simple operations around time or possibly doing simple arithmetic. Although they may be able to serve as an alarm clock, stopwatch, timer, or calculator, everything is still controlled by a single process whose capabilities are limited to the tasks defined when the watch was designed and produced. It is realistic to consider that the designers of a fixed purpose device can evaluate all of the behaviors of the device and guarantee that the device always functions correctly.

In addition to fixed purpose devices, multifunction, or general purpose, portable computing devices are very prevalent. These devices allow users to, for example, play movies, music, video games, and/or other types of media from an internal or external memory. These devices also support additional functions, such as those associated with cellular phones, portable digital assistants (PDAs), and traditional desktop computing (notebooks). Unlike fixed purpose devices, multifunction devices are typically set apart by having an operating system which provides a platform upon which the original designers or third parties may extend the functionality of the device. Because the designers are not able to determine all of the different tasks the device will ever perform they cannot guarantee that the device always functions correctly. This responsibility is now shared by all individuals who choose to extend the functionally of the device. The devices come in many shapes and configurations, and offer a wide variety of functionality.

Portable computing devices of this type are commonly equipped with solid state memories (e.g. non-volatile RAM (random access memory) or flash memory) to store the media. However, these devices are limited in the amount of media that can be stored. To increase storage capacity, a device can be equipped with hard disk memory that is capable of holding large quantities of media, such as full-length movies and extensive music libraries. The drawback of using hard disk memory is that accessing content is slower and less responsive in comparison to solid state memory. Thus, users may encounter noticeable delays between the time they select play and the time music is heard or video seen, resulting potentially in an unsatisfactory user experience. Additionally, accessing content on the hard disk memory typically consumes more power than accessing content in solid state memory. For example, digital media playback can be a CPU and file system intensive task. Both of these systems can place significant demands on the overall power requirements of a computer. In contrast, this is typically not a significant issue on a desktop computer because it has a constant power supply readily available. However on portable devices, where battery power is the primary source, problems occur. The heavy demands placed on the battery by the CPU and the different devices used to store data can severely limit the overall battery life of the device and its attractiveness to the consumer.

Designers of portable computing devices and those who write software to extend multifunction devices are therefore faced with a number of competing design challenges, including maximizing battery life, providing a responsive user interface for a satisfactory user experience, and supporting extended periods of playback. Designers have been generally resigned to satisfying one or possibly two of these challenges, while sacrificing the others. But, with each generation of devices, consumers demand more.

SUMMARY

Aspects of the invention allow for the management of a cache memory of a portable multifunction computing device such that data to be processed by an application executing on the device is retrieved from one or more cache segments. In one embodiment, a caching application manages the storage and retrieval of media to and from the cache segments based on the size of the media and caching opportunity determined by monitoring memory and other requirements from other applications executing on the portable multifunction device. Accordingly, the device can offer an enhanced user experience while minimizing hard disk access, thereby conserving power and maximizing battery life, and ensure that all applications have adequate memory available to perform their intended functions.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
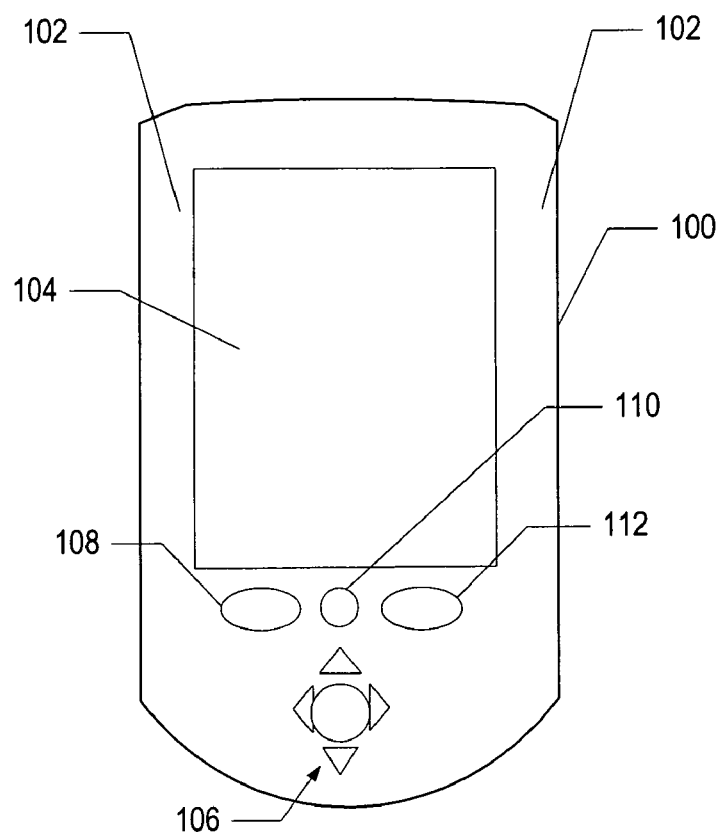
FIG. 1 is an exemplary embodiment of portable multifunction computing device which the invention may be implemented.

FIG. 1 shows a portable multifunction computing device 100 capable of performing multiple functions, such as playing music and videos, depicting digital photos, downloading content from the Internet, and the like. In the illustrated embodiment, the device 100 has a body or casing 102 and a display panel 104 located centrally within the casing 102. The display panel 104 is, for example, a flat panel, color display with sufficient resolution to depict digital images or motion video. The display panel 104 may optionally be implemented with an overlaid touch screen to facilitate user input. The display panel 104 may be implemented using different technologies, including LCD (liquid crystal display), OLED (organic light emitting diode), plasma, and DLP (digital light processing).

Function control buttons 106 are positioned relative to the display panel 104 to support user control of the device 100. In the illustrated implementation, the control buttons 106 include four directional buttons and an entry key. Buttons 108, 110, and 112 are positioned above the control buttons to facilitate additional navigation within the user experience. One or more other buttons may also be provided to permit control of other functions, such as shuttle, volume, brightness, contrast, and so forth. It is noted that the device 100 is just one exemplary implementation, and that other configurations and physical layouts, with more or less buttons and features, may be used.

The display panel 104 (and optional touch screen) and buttons 106, 108, 110, and 112 provide a user interface (UI) to facilitate user interaction with the device 100. The screen shows, for example, a playlist and menu options, while the hard or soft-key buttons facilitate navigation of the menu, selection of items on the menu, and entry of control commands (e.g., shuttle controls, volume, etc.).

Figure 2:
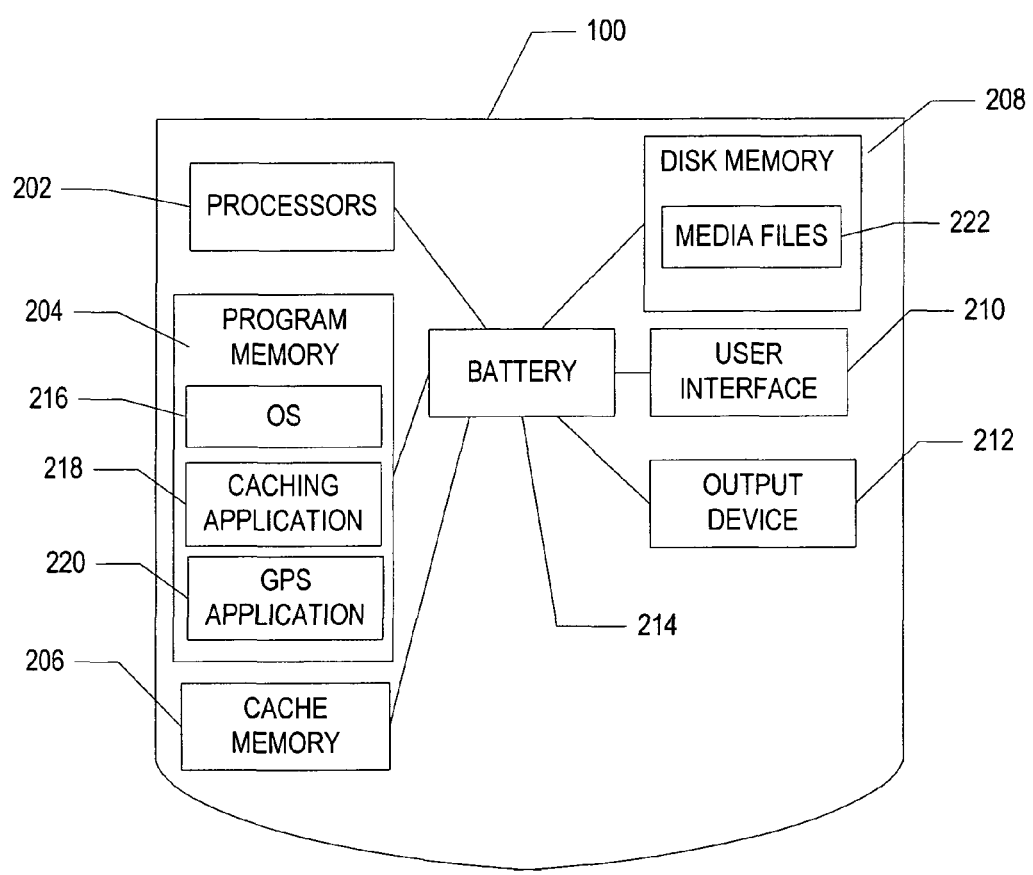
FIG. 2 is an exemplary block diagram illustrating components of a portable multifunction computing device.

FIG. 2 shows selected operational components of the portable multifunction computing device 100. The device 100 includes one or more microcontrollers or processors 202, a program memory 204 (e.g., ROM, flash, NVRAM, etc.), a cache memory 206 (e.g., RAM), a hard disk memory 208, a user interface 210, output components 212, and a battery 214. The processor(s) 202 may include general-purpose processors and/or special-purpose processors, such as graphics processors. It is noted that other configurations are possible. Typically cache memory 206 is included as part of program memory 204 (rather than separate as shown). Alternative embodiments of device 100 where dedicated cache memory 206 is available are applicable to the embodiments of the invention described herein when cache memory 206 is a shared resource that may be either assigned dynamically as program memory 204 or shared among more than one caching application.

Program memory 204 is typically partitioned to store both instructions to be executed by the processor(s) 202 and data representing the current state of the different programs being executed. In this illustration, the instructions and state data for an operating system 216, an intelligent media caching application 218, and a GPS (Global Positioning System) application 220 are stored in program memory 204 and executed on the processor(s) 202. Simultaneous execution of multiple applications stored in program memory 204 is under the control of OS 216 and may proceed in either a cooperative or preemptive multitasking fashion. The battery 214 supplies power to the components of the computing device 100. The battery 214 is preferably a rechargeable battery, such as a lithium-based battery.

In one embodiment, the disk memory 208 stores media 222. There are many types of media, including video content (e.g., movies, TV programs, home videos, etc.), music content, digital photos, video games, and the like. The media 222 is stored as individual files that can be accessed and played by applications stored in program memory 204 using processor(s) 202. The disk memory 208 has sufficient capacity to store many media files, and has substantially more storage capacity than cache memory 206. For instance, in certain implementations, the disk memory 208 may hold a library of music titles or short video clips, whereas cache memory 206 is sufficiently large to store only several minutes of audio or video information. Notably, the contents of disk memory 208 are not limited to media files 222. As space becomes available, other applications (e.g., GPS application 220) may persist information in disk memory 208. In general, hard disk memory 208 is exemplary of any computer readable storage medium that due to its standard method of input requires more power than other storage mediums to perform its functions. For example, in addition to traditional hard disk memory this may include optical storage devices or any other device where the storage medium is mechanically spun.

The user interface (UI) 210 facilitates user interaction with the device. The UI 210 in one embodiment includes a graphical user interface depicted on the display panel 104, and hard-key buttons 106-112 that allow user control. It might also include a touch screen overlaid on the display panel 104. With the UI 210, a user in the context of caching application 218 can browse through playlists of the media 224 stored in the disk memory 208 and select individual media items for playback. It is assumed that the OS 216 enables the user to choose between the different available UI contexts represented by the applications stored in program memory 204. For example, the user may elect to switch the user experience context from media caching and playback application 218 to GPS application 220. The output components 212 generate the audible sounds or visible images when the media items are played. These components might include, for example, audio outputs (e.g., speaker, speaker output port, etc.), display outputs, and/or the display panel 104.

According to one embodiment of the present invention, the cache memory 206 is sufficiently sized to hold snippets or portions of a large media file 222, or contiguous media within one or more sequential files. During play, the processor 202 reads from the cache memory 206 under control of caching application 218. That is, rather than reading media 222 from the disk memory 208 as media is read out from the cache, the subsequent media file in the playlist is also read from the cache 206. In this manner, the operation of heavy power consuming devices such as the motors that spin the disk upon which the disk memory is stored can be reduced. Additionally any disruption to disk operation caused by activity (e.g. jogging, skiing, etc.) will not affect performance. As media is read out for processing, cache memory 206 is made available for other media. Only when caching application 218 determines that more media must be read from disk memory 208 and placed in the cache memory 206 does the process of refilling caching memory 206 begin. Moreover, the media caching program monitors memory requirements of other programs and applications such as the GPS application 220 currently in use on the portable multifunction computing device 100 to ensure sufficient cache memory is available for such programs and applications. By caching as much media as possible prior to processing, for example, a playlist, while ensuring sufficient cache memory is available for other active programs and applications, the power demands placed on the battery 214 by the processors 202 and storage device (e.g., disk memory 208) are reduced. Thus, the overall battery 214 life of the device 100 can be extended.

The device 100 typically has at least some form of computer readable media. Computer readable media, which include both volatile and nonvolatile media, removable and non-removable media, may be any available medium that may be accessed by computer 100. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by device 100. Combinations of any of the above are also included within the scope of computer readable media.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

Figure 3:
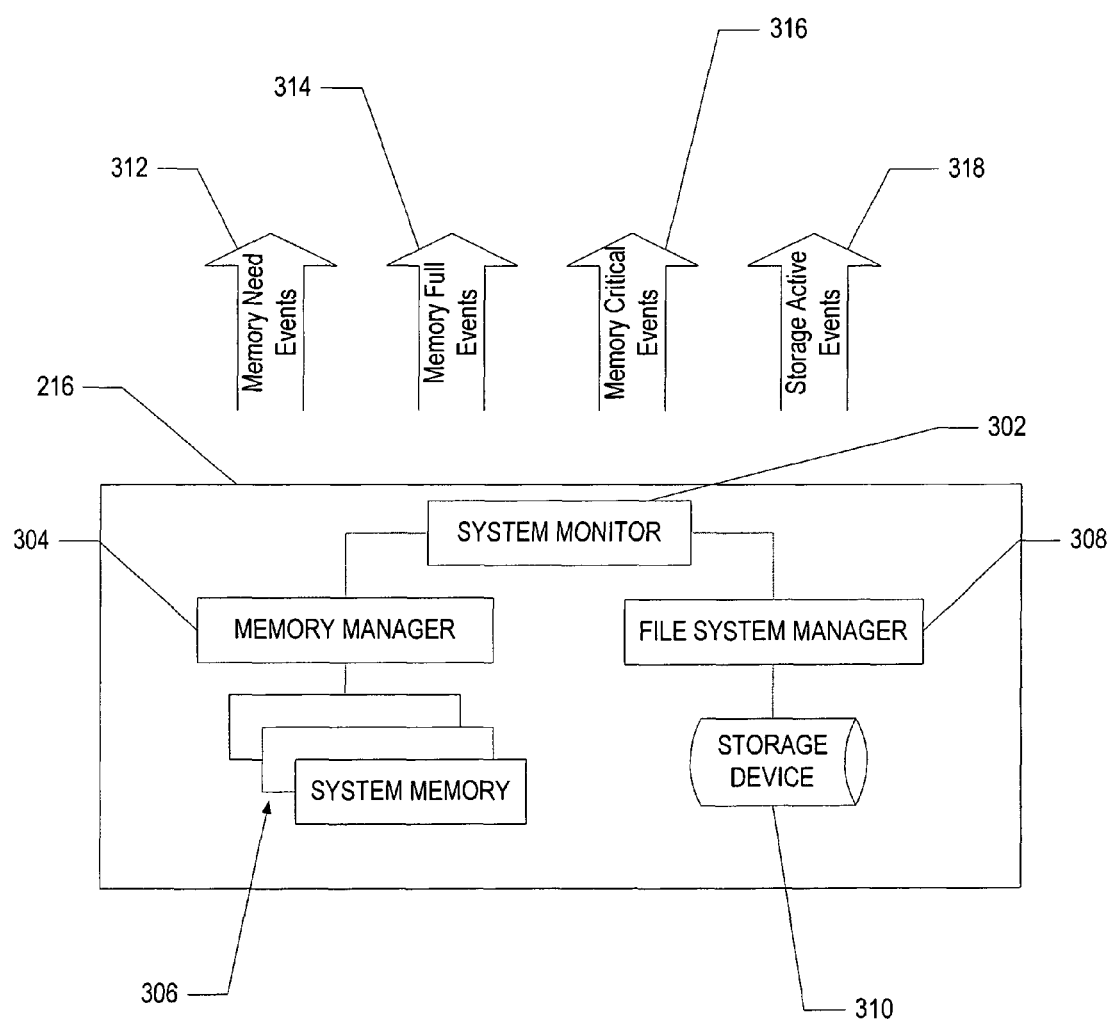
FIG. 3 is an exemplary block diagram illustrating memory management components of a portable multifunction computing device.

Referring now to FIG. 3, a block diagram illustrating components of a portable multifunction computing device operating system 216 for monitoring and reporting state information. System monitor 302 represents an abstraction for zero or more discrete operating system functions that monitor different pieces of information about the state of operating system 216. Those skilled in the art will readily recognize that system monitor 302 need not correspond directly to a single identifiable function of operating system 216. In one embodiment, the system monitor 302 may be a collection of APIs capable of providing information about the current state of the different components of multifunction device 100 that may be checked at regular polling interval by applications (e.g., operating system 216, caching application 218 and GPS application 220) executing on processor 202. In such embodiments, the applications themselves fulfill the responsibilities typically reserved for system monitor 302.

In an alternative embodiment, the system monitor 302 includes a specific operating system component capable of sending events to interested applications. There is no requirement that these events be sent in a synchronous fashion causing operations to wait until all interested applications have processed the events. In this environment, the different applications executing on processor 202 have the option of requesting notifications from system monitor 302. Depending on implementation decisions made by the author of operating system 216 and the processing environment of device 100 applications may communicate directly with system monitor 302 or one of its components to complete this registration process. For example, in one embodiment system monitor 302 may provide a function that can be called by applications executing on processor 202 to request notifications from system monitor 302. Alternative embodiments may allow applications to specify the exact notifications they are interested in receiving. Different embodiments of system monitor 302 may dedicate an area of storage, in program memory 204, cache memory 206, disk memory 208, or other areas which change when an event takes place. Applications wishing to receive notifications from system monitor 302 simply check the value of this location and, if changed, recognize that system monitor 302 has sent a notification. Other methods for sending notifications from one component to another component exist and the descriptions provided here are not intended to restrict communication from system monitor 302 to interested applications to just the examples provided. In addition, other models exist for applications determining the state of different operating system components and where those models provide the information described as part of this invention they are recognized as applicable embodiments.

Typically the memory manager 304 of operating system 216 is capable of allocating and de-allocating memory for use by the different applications (e.g. operating system 216, caching application 218 and GPS application 220) executing on processor 202 of portable multifunction device 100. Since the memory systems of multifunction device 100 is a finite resource, memory manager 304 is also responsible for denying requests for memory made by applications executing on processor 202. While the fact that memory manager 304 may deny requests for memory is important, the specific manner in which applications other than caching application 218 executing on processor 202 respond to being denied memory is beyond the scope of this invention. A system monitor 302 is configured to monitor the state of memory manager 304 and report changes in state to applications configured to listen to the events 312, 314, and 316 generated by system monitor 302. When an application (e.g. GPS application 220) requests a block of system memory 306 from memory manager 304, memory manager 304 may discover that there is not enough system memory 306 available to respond to the request. This state does not indicate that all memory requests cannot be fulfilled only that the specific request being handled cannot be fulfilled from the available memory. Memory manager 304 then actively or passively notifies system monitor 302 of this fact. At which point system monitor 302 may send an event or otherwise signal interested applications executing on processor 202 that a memory need event 312 has occurred. Applications which receive this notification may take action on the event to release memory currently allocated by them to make more memory available to memory manager 304 to fulfill the request. As applications use memory, memory manager 304 may reach a point where it decides based on an unspecified process that there is no more memory available in the system for general distribution to requesting applications. This state does not imply that all memory within the system is allocated. Rather it indicates that the system has reached a state in which the memory that remains reasonably needs to be reserved for safe operation. When memory manager 304 determines that this is the case it will notify system monitor 302 through active or passive means that a memory full event 314 needs to be sent. Applications listening to the memory full event 314 may choose to release memory back to the system to relieve the pressure being felt by the system memory 306. If the pressure is not released and the remaining memory is consumed by new requests, memory manager 304 will actively or passively notify system monitor 302 that a memory critical event 316 needs to be sent. This event indicates that the system is running dangerously low on memory and that system stability may come into question. Again applications listening to memory critical events 316 are free to determine how they respond but the hope is that they will release memory back to the system so that it can continue to operate safely. Again alternate embodiments of system monitor 302 and memory manager 304 may exist which define different events when available memory in system memory 306 becomes low. Provided that caching application 218 is able to determine these states and respond to them they are considered applicable to this invention.

In addition to memory manager 304, a file system manager 308 is a known operating system feature that controls access to data stored on storage device 310 (e.g., hard disk memory 208). Through file system manager 302 applications executing (e.g., operating system 216, caching application 218, and GPS application 220) on processor 202 of device 100 read file data from and/or write file data to storage device 310. In one embodiment, a system monitor 302 actively or passively receives information from file system manager 302 about the state of activity on storage device 310. Based on this information it may send events to interested applications that have registered with system monitor 302. In one embodiment, caching application 218 is particularly interested in the storage active event 318. This event indicates that storage device 310 has started to draw more power in response to a request made through the file system manager 308. Support for storage active event 318 is not a fundamental requirement of this invention but in multifunction devices where significant access to hard disk memory 208 is made by applications other than caching application 218 it is a recommended feature.

Figure 4:
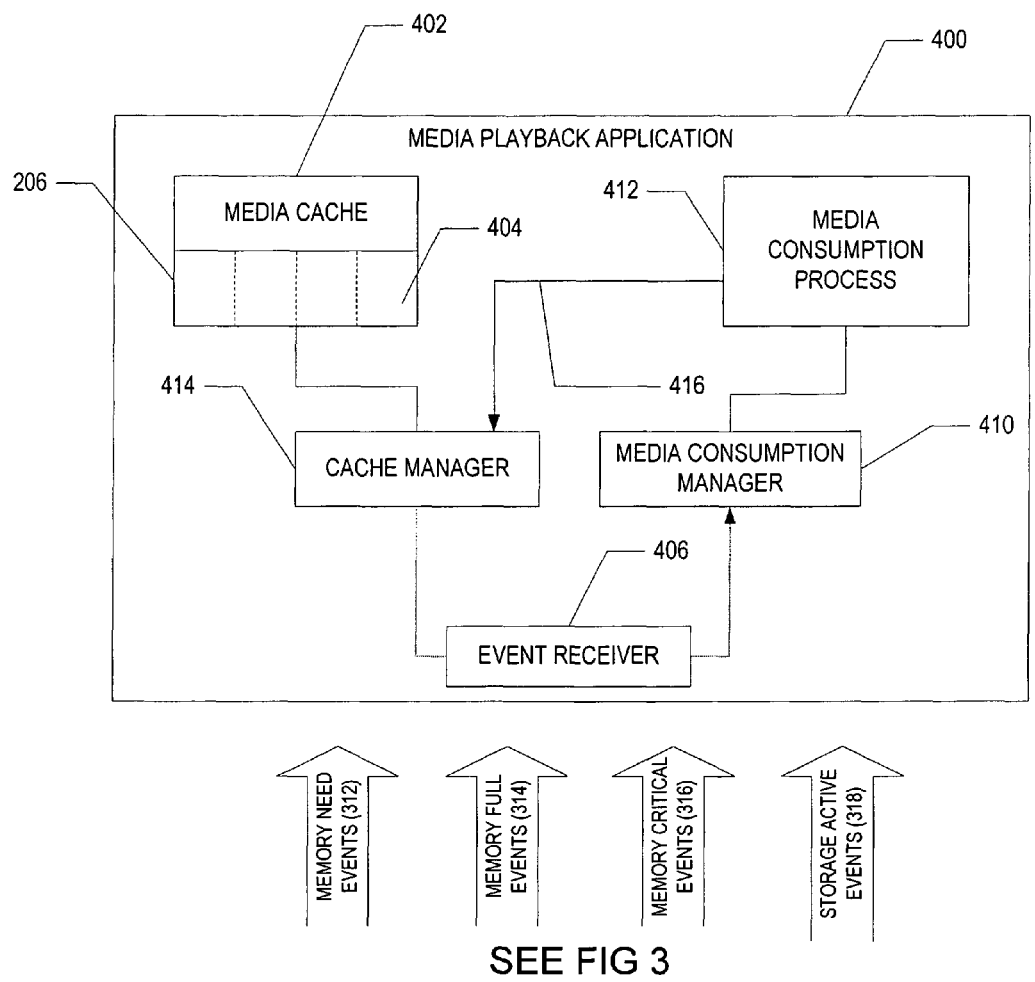
FIG. 4 is an exemplary block diagram illustrating components of a caching application.

Referring now to FIG. 4, a block diagram illustrates components of a media playback application 400 (e.g., caching application 218) for managing cache memory (e.g., cache memory 206) for playback of digital media according to one embodiment of the invention. A cache management component 414 segments the cache memory 206 to define media cache(s) 402 for the different items that need to be cached. Since caching application 400 needs to respond to memory usage events 312, 314, and 316 from system manager 302 a simple caching model where a single block of memory sized large enough to hold the item being cached is not sufficient. To enable the caching application 400 to respond to these events, each media cache 402 is made up of a collection of cache segments 404. These segments may be added or removed from the media cache in response to memory usage events. Typically the storage capacity of each cache segment 404 is determined by empirical modeling and then pre-programmed into the cache defining component 402. The number of segments required to cache a particular item is determined based on the item being cached in media cache 402 and the amount of cache memory available.

Figure 5:
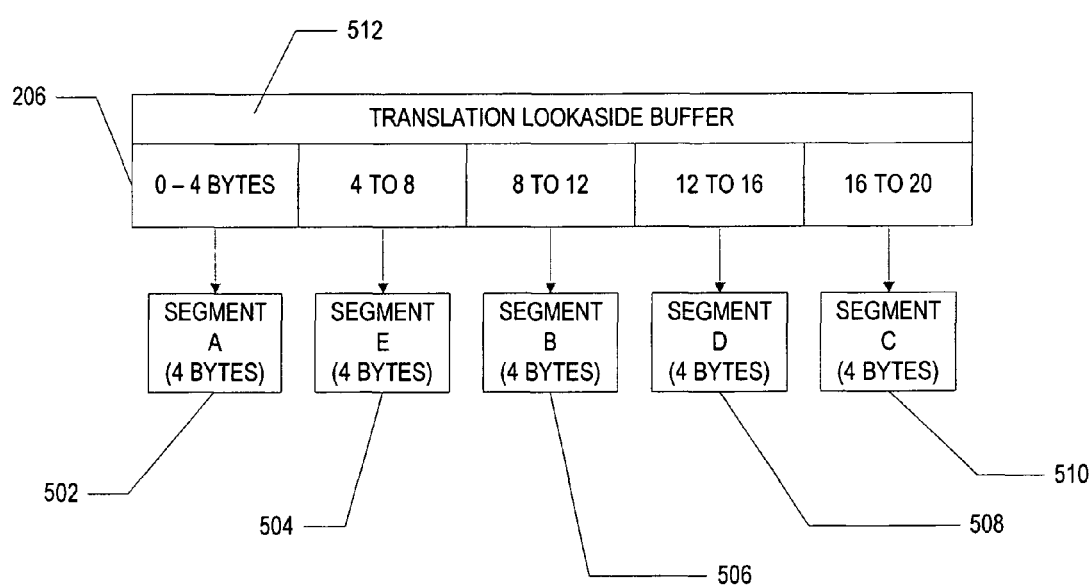
FIG. 5 is an exemplary block diagram illustrating a segmented memory cache.

Referring briefly to FIG. 5, an exemplary block diagram illustrates the segmentation of a media cache 402 into a subset of five cache segments (e.g., Segment A 502, Segment E 504, Segment B 506, Segment C 508, and Segment D 510). Consider that the item being cached by media cache 402 is 18 megabytes in size and that each cache segment is capable of storing 4 megabytes. In order to accommodate the item a total cache of 20 megabytes is required since segments are of a fixed size and cannot be partially allocated. Because the cache segments 404 may be allocated at different times there is no guarantee that the memory holding the first 4 megabytes of data is contiguous with the memory holding the next 4 megabytes of data. This is the case in FIG. 5 where segment E 504 was allocated after segments A 502, B 506, C 508, and D 512 but is storing the second 4 megabyte block of data from the file. To deal with the fact that the cache is made up of segments of potentially non-contiguous data, a translation lookaside buffer (TLB) 512 can be used to map between request for a particular range of data and the cache segments storing that data. This is similar to how hardware memory caches are typically implemented in CPUs. In examining TLB 512 note that it contains pointers to each of the cache segments making up media cache 402. When a request is made for the data located at a particular offset in the cache, for example the 128 bytes found starting at an offset of 10 MB, the first operation is to determine which cache segment contains the data. In the simplest embodiment this is done by creating an array of pointers to the cache segments. The value of the item stored at the starting index of the array points to the first cache segment, the value of the next index points to the next cache segment, and so on. To determine which cache segment contains the desired offset, an integer divide of the offset by the size of each cache segment is performed. The resulting integer value may be added to the starting index of the array to locate the segment that holds the offset being requested. Returning to the example above, an integer divide of 10 MB by 4 MB is performed yielding 2 indicated that the desired value is in the third segment (starting offset+2). Once the segment is located it is necessary to determine the location within the segment where the requested offset is located. To do this the product of the integer value determined by dividing the offset by the segment size is multiplied by the segment size and then subtracted from the offset. This new result provides the location in the segment. Again returning to the example, the yielded 2 is multiplied by 4 MB yielding 8 MB which is then subtracted from 10 MB yielding 2 MB. The desired offset is located 2 MB into the third segment in the cache. Note that as data is retrieved from the different segments care must be taken to make sure that blocks of data requested which extend across segment boundaries are correctly located and returned. Alternative embodiments of a simple array based translation buffer exist which are designed to reduce the overall memory requirements of media cache 412 when it is sparsely populated.

Referring back to the illustrated embodiment of FIG. 4, a media consumption manager 410 is defined which is responsible for determining how a collection of zero or more items is to be presented by the media playback application 400. The manner in which media consumption manager 410 determines the order in which the items is presented is beyond the scope of this invention. As the media consumption manager drives playback of the playlist it begins by first caching as many of the media files in the playlist as possible. That is, once playback starts, the media consumption manager 410 requests successive files in the playlist "queue" or "cache" themselves for playback so that the next N files are stored in N media cache(s) 402 and ready to play. In one embodiment the actual mechanism of caching a file involves first creating a media consumption process 412 capable of playing the piece of content being cached. The media consumption process 412 contains all of the business rules and other logic necessary to convert audio, video, or still images into a multimedia presentation. After the media consumption process is created and bound to the desired file it requests a media cache 404 to hold the contents of the file to which it is bound. A cache manager 414 is responsive to a request (cache request), as indicated by reference character 416, from the media consumption component 412. If cache manager 414 determines that enough memory is available, a media cache 402 is created and returned to the media consumption process. Once created, media cache 402 is configured to automatically begin retrieving the contents of the associated media file from disk memory 208 in either a cooperative or preemptive fashion until its assigned memory partition is used. If cache manager 414 determines there is insufficient memory to hold the cached file, a pending request is created and held by the cache manager 414. This stops the caching process and determines the number N of files that are currently cached. Once cache manager 414 can no longer cache the next file in the sequence in its entirety, that file and any remaining media files in the playlist that have not been queued, or cached, will only be queued when either no media cache 402 remains in use, the current media cache 402 in use is transitioning to the end of playback in preparation for the next item to play, or in response to a storage active event 318. (See FIG. 9). During playback, the media consumption manager 410 sequentially transfers control to the media consumption process 412 as playback continues. Media consumption process 412 retrieves media files from its associated media cache 402 rather than from the disk memory or system memory. As indicated above, the media consumption manager 410 tracks which media files have been processed (e.g., completed playback). After identifying media that has been processed, the media consumption manager 410 releases the media consumption process 412 associated with that piece of media causing the media cache 402 for the media to be released as well.

Media consumption manager 410 and cache manager 414 are configured to respond to event receiver 406 when it retrieves specific events. Event receiver 406 is a component of the media playback application 400 that has registered for memory events 312, 314, and 316 sent by system monitor 302 of operating system 216 in multifunction device 100 (See FIG. 3). In addition event receiver 406 is configured to respond to storage active events 318 if available. As indicated, the term registration is used to describe the concept that event receiver 406 is capable of determining through active or passive manners different operating system states and requesting action on the part of media consumption manager 410 and cache manager 414 to respond to changes in state.

Figure 6A:
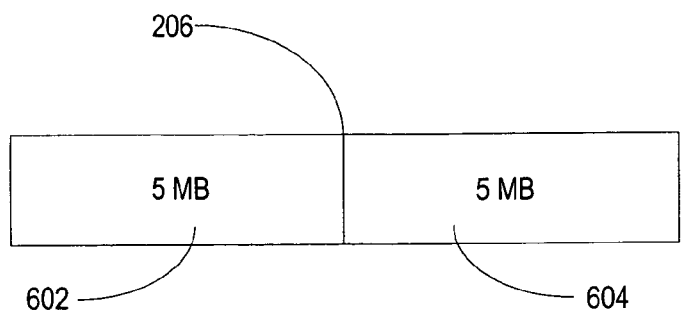
FIGS. 6A-6D illustrates various storage states of a segmented memory cache.
Figure 6B:
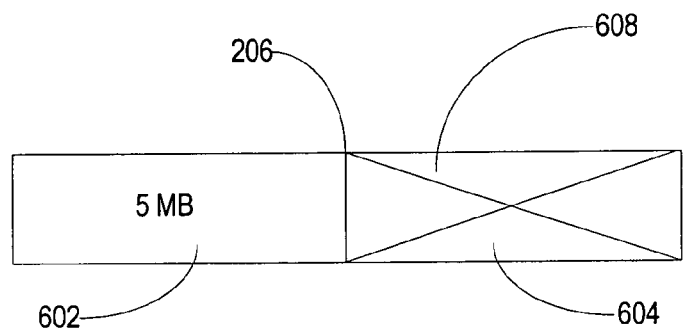
Figure 6C:
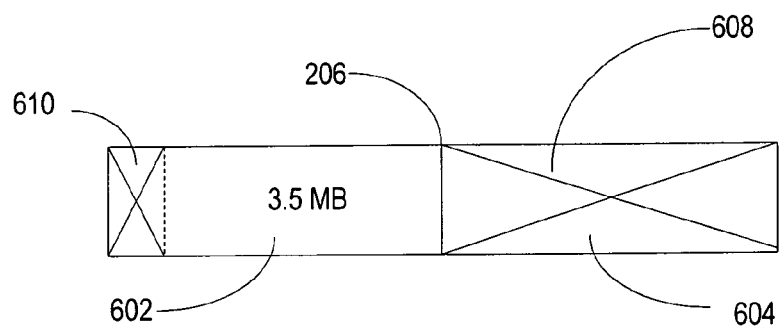

When system requirements change event receiver 406 receives a subsequent memory event 312, 314, or 316 indicating that more memory is required by the system to fulfill memory requests to memory manager 304, and it contacts media consumption manager 410. Media consumption manager 410 then determines how to remove file data from cache memory 206 to preserve an optimal playback experience. In one embodiment, the media consumption manager starts by removing the last media item in the queue of cached content if more than one item is in the cache. For example, consider a ten (10) megabyte cache memory 206 segmented in two media caches 602, 604 of five (5) megabytes each. (See FIG. 6A). Further, consider two media files from a playlist have been cached for playback on the device 100 such that media cache 602 stores a first media file of five (5) megabytes and media cache 604 stores a second media file of five (5) megabytes. Thus, cache memory 206 has no more available storage capacity. Further consider that a GPS program or some other program is executed on the device 100 and requires three (3) megabytes of memory for a mapping operation. If the first media file is currently being retrieved from media cache 602 for playback on the device 100, the media consumption manager 410 removes the second media file from cache segment 604 to provide storage space for the GPS program (See FIG. 6B). According to this embodiment, all requests for additional memory first cause the last unplayed file placed in the cache to be removed first. A full file is removed even if the size of the request is less than the total size of the file in the cache. In other words, cache segment 604 now has five (5) megabytes of available storage, as indicated by reference character 608, which can be used to fulfill the three (3) megabytes requested by the GPS program. Alternatively, when the current media file being processed is the only content remaining in the cache memory, the media consumption component 412 can reduce the size of its cache to provide more memory back to other processes. For example, if the GPS program requires additional cache memory for mapping (e.g., 6.5 megabytes), and the media consumption manager 410 identifies that only one file is playing, instead of removing the file from the cache, it instead requests that media consumption process 412 associated with the file reduce the size of the 5 MB cache 602 by 1.5 MB to provide memory back to the system. The cache determines that the portion of the first media file that has completed playback and removes the processed portion from cache segment 602. After 1.5 megabytes of the first media file have been removed from segment 602, the cache segment 602 has available storage space, as indicated by reference character 610, which can be used by the GPS program. (See FIG. 6C). Since it is possible for memory events to occur at any time during playback, there is no guarantee that the currently playing item has completed playback of enough memory to respond to the current request by just throwing out data that has already been used. Under this situation the cache will first try to throw out any memory from data that has been presented and then will begin taking from the end of the cache. For example assume that only 500 KB of the media item had been played. When media cache 602 is requested to reduce its cache by 1.5 MB it will first recognize that it can free 500 KB of data from what has already been played as indicated by reference character 610. It will then reduce the end of the cache by 1 MB to provide a 1.5 MB to the GPS application, as indicated by reference character 612. (See FIG. 6D).

Figure 6D:
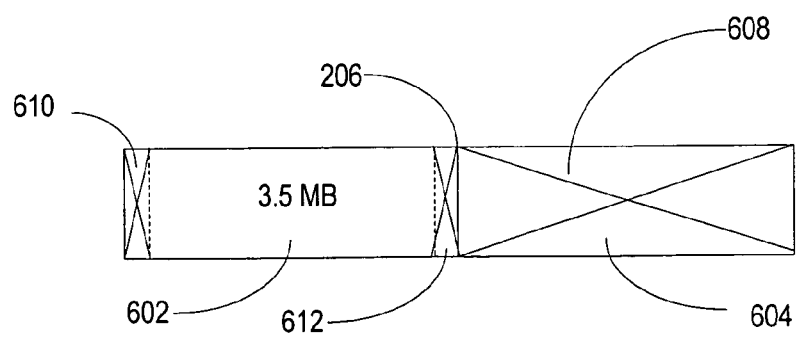

Still referring to FIG. 6D media cache 602 has now entered into a state where it does not have enough memory to hold all of the contents of the associated media file. Media cache 602 has entered windowed operation mode in which a portion of data starting at or before the current position of playback is held in the cache. As playback advances the definition of the window is moved such that the current position of playback is always within the range of data presented in the window. In the typical case where playback is proceeding, the cache will determine at some point that the window needs to be updated so that playback is not interrupted. Typically this is handled by empirically determining some point near the end of the window which will cause the cache window to be updated after playback has reached this position. In other embodiments data flow analysis may be applied to empirically determine how to keep the cache optimally filled as the contents are being consumed. Windowed cache mode is also employed to support playback of media files or loading of other sequentially accessed data through the cache when the size of the content is too large to fit entirely within available cache memory 206. Referring to FIG. 6D consider an alternative scenario for the current state of cache memory 206. In this scenario a GPS application has already been running and allocated the portion of cache memory referred to at 604/608. A second application, for example an electronic mail application, is also in use and has taken the portion of memory at 610. Finally a third application, for example a calendaring application, has requested and received the memory at 612. When the caching application 218 determines that a portion of cache memory is needed in order to play a media file 15 MB in size it discovers that only 3.5 MB of cache memory is currently available. As a result, the cache manager 414 assigns 3.5 MB of cache memory to accommodate caching the 15 MB file and initializes a window at the beginning of the file to hold the first 3.5 MB of data from the media file. As playback reaches a point near the end of the 3.5 MB of data available in the cache, the cache updates the cache window such that it now starts at the current playback position and extends for 3.5 MB from that position. This process repeats until the last 3.5 MB of the file is in the cache window.

In order to achieve savings in battery life by using a content cache as described herein to limit access to a storage device 310 with large power requirements, it is necessary to minimize the need to access the storage device 310. If the entire content may be stored in cache memory 206, there is no need to access the storage device 310. In the event that the cache must operate in windowed mode, the storage device 310 must be accessed periodically to refill the contents of the window. As described above, this typically happens when the access to the content reaches some empirically determined location and the cache window is moved. Because exact user behavior is not predictable, in one embodiment, repopulating the contents of the cache window is delayed until the first time data is required that is within the current cache window but not necessarily available in the cache. Once access to storage device 310 begins it is typically more power efficient to access all data necessary to fill the cache rather than waiting for it to be requested. In an alternative embodiment, it is recognized that the multifunction device 100 is capable of executing many different processes and that processes other than the caching application 218 may need to access the storage device 310. Referring briefly to FIG. 3, it is noted that file system manager 308 is capable of using system monitor 302 to send a storage active event 318. Also, in FIG. 4 it is noted that event receiver 406 of the media playback application 400, which is an exemplary implementation of caching application 218, is configured to receive a storage active event 318. When the event receiver 406 receives the storage active event 318 it notifies any active media cache 402 via the media consumption manager 410 and media consumption process 412 that the storage device 310 is active. If media cache 402 is operating in a windowed mode, the media cache 402 can update the window at this point and fill it in order to maintain optimal power consumption for storage device 310. In addition, cache manager 414 receives notification of a storage active event 226 from the event receiver 406 and can fulfill any pending cache requests when sufficient cache memory 206 is available.

In the event that no media file is currently being played or when the current media file being played by the media consumption process 412 under the control of media consumption manager 410 has completed playback, it is necessary to transition to the next item in the playlist. Note that in the case where no media file is being played the next item in the playlist is the first item to be played. When this transition occurs, the item that has completed playback is typically released and any assigned media cache 402 releases its memory back to the pool of available cache memory 206. If the next media file being transitioned to has been assigned a cache by the cache manager 414, then playback transitions to the associated media consumption process 412 and its accompanying media cache 402. If, however, the cache manager 414 was unable to fulfill the request because insufficient cache memory 206 was available or because cache manager 414 has not previously been requested to provide a cache for this particular media file, the request is fulfilled immediately. In the event that enough cache memory 206 is available to hold the entire contents of the new item a media cache is created of the appropriate size and assigned to media consumption process 412 for the file. If there is not enough memory 206 available to cache the entire file, a cache window is defined for a media cache 402 and assigned to the media consumption process 412 for the file. In the event that no cache memory 206 is available for fulfilling the cache request alternate methods of playback may be considered including directly accessing the contents of the media file from disk memory 208 regardless of the battery implications of so doing. With regards to refilling the cache after the initial allocation, alternative embodiments may elect to refill a portion of the cache at other events. As indicated some may use a storage active event 318 to trigger cache filling. Other embodiments may elect to monitor the amount of available cache memory 206 and when an appropriate amount of memory has become available begin filling the cache. Still other embodiments may elect to monitor the amount of available memory and if operating in windowed mode elect to increase the size of the media cache 402 to allow a larger window of data from the source to be held in the cache 402.

Figure 7:
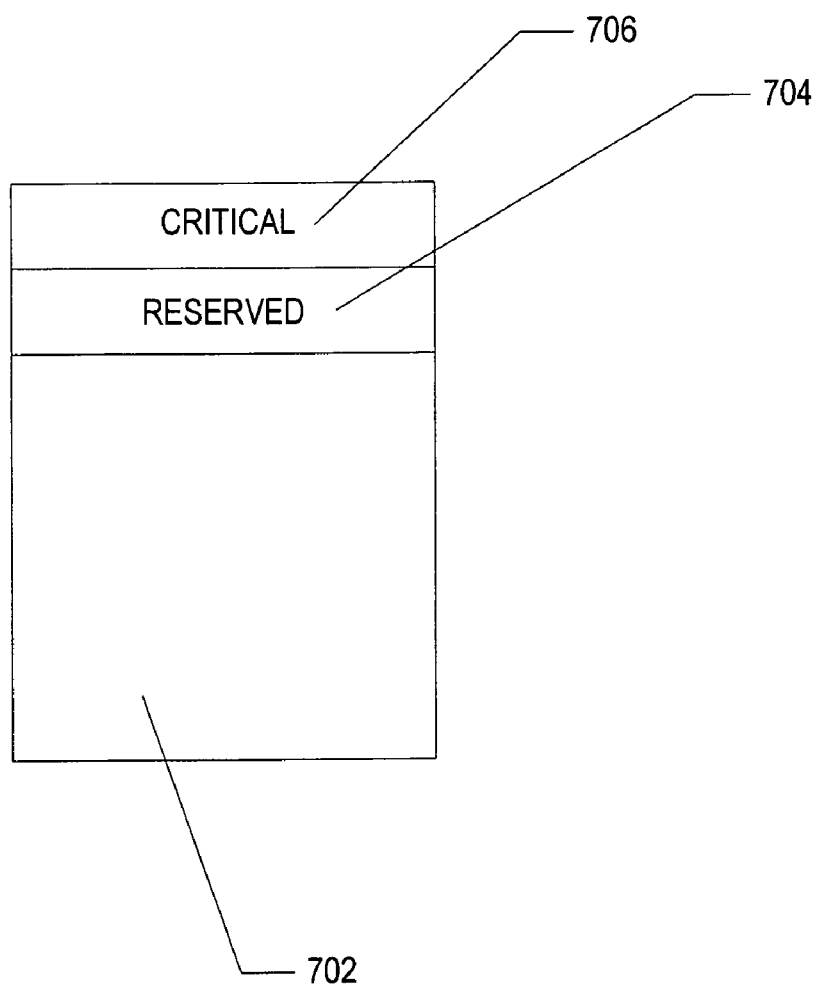
FIG. 7 is an exemplary block diagram illustrating a partitioned memory.

Referring now to FIG. 7, a block diagram illustrates a partionable memory 700 within a portable multifunction computing device 100. For simplicity the memory 700 is represented as a single block. Notably, in an actual application it may have certain portions reserved for device operation. As this representation is merely illustrative such reserved portions are ignored. As described above in reference to FIG. 2, program memory 204, which contains both executable instructions and state data and cache memory 206 are partitions of a larger memory pool such as memory pool 702. In an environment as described herein, caching application 218 must establish limits on the amount of the memory that can be assigned to a cache. In one embodiment, where the size of the memory pool 702 is known (e.g., memory of a multifunction computing device 100) it is possible to decide that cache memory 206 will never be allowed to consume more than a fixed percentage of the total memory pool 702.

An alternative embodiment of cache sizing allows the cache memory 206 to consume as much memory of memory pool 702 as possible. In such an embodiment, when the caching application 218 is the only application in use on device 100, any memory not required by the operating system 216 can be assigned to the caching application 218 for use as either cache memory or as storage for data and state information. However, when assigning all available memory, it is necessary to first quantify the amount of memory in memory pool 702 that is not already assigned to the operating system 216. In one embodiment operating system 216 supports a method for determining the amount of available memory which caching application 218 may use to determine how large a partition of memory pool 702 is available for cache memory 206. An alternative embodiment of caching application 218 leverages the method just described but adds additional logic to guarantee that operating system 206 has enough memory to successfully fulfill requests. Since a multifunction device 100 is by its design extensible to support other functions it is difficult to define or predict how much memory of memory pool 702 will be required to fulfill all of the requests made through operating system 216. The method described above wherein an amount of available memory is returned is typically an instantaneous snapshot of the available memory and does not take into account the demands that future operations may or may not place on the system. If these future operations require significant amounts of memory from memory pool 702 to complete processing and that memory has already been used by caching application 218 as cache memory 206 there may not be enough memory available. In this scenario, operating system 216 may begin to have undesired and sometimes unpredictable behavior. To make sure that operating system 206 has enough memory to complete its task caching application 218 in addition to using the method for determining the amount of memory instantaneously available, can define two partitions of memory pool 702 to limit the amount of memory that can be used as cache memory 206.

A reserved partition 704 is a partition of memory pool 702 that caching application 218 reserves for its own operation. This partition is excluded from use as cache memory 206. In addition the critical partition 706 is reserved by caching application 218 for use by operating system 206. In an embodiment where the size of memory pool 702 is well defined the size of the reserved and critical partitions may be hard coded into caching application 218. Alternative embodiments define the size of the critical and reserve partitions by monitoring the amount of available memory as expressed by a method of operating system 206 and defining a set of bounds to establish the limit. For example the lower bound for reserved partition 704 may be 4 MB of free memory while the upper bound is 2 MB of free memory. The lower bound for the critical region is the same as the upper bound for the reserved region, e.g. 2 MB. The upper bound for the critical region is reached when memory pool 702 has been completely allocated or potentially slightly before. Consider the lower and upper bounds of the memory pool in the context of an empty bucket. As memory is allocated water is added to the bucket. When the water (memory) reaches a lower bound of 4 inches (MB) from the top of the bucket the reserved partition has been entered. When it crosses the upper bound of 2 inches (MB) then the reserved partition has been left. Thus, the caching application 218 monitors the amount of free memory and takes action when memory enters the reserved or critical partition. In one embodiment, caching application 218 treats entering the reserved or critical partitions the same as memory full event 314 or memory critical events 316. The end result is that the amount of memory pool 702 allocated as cache memory 206 is reduced until the caching application 218 determines that all reasonable efforts have been made to free memory back to the system and/or caching application 218 determines that memory usage has exited the critical or reserved partition. Alternative embodiments may simply cancel current operations or change behaviors to try a free memory from cache memory 206. While the model herein is described in the context of a caching application 218 and an operating system 206 executing on device 100, it has similar applicability when more applications are executing on device 100.

Figure 8:
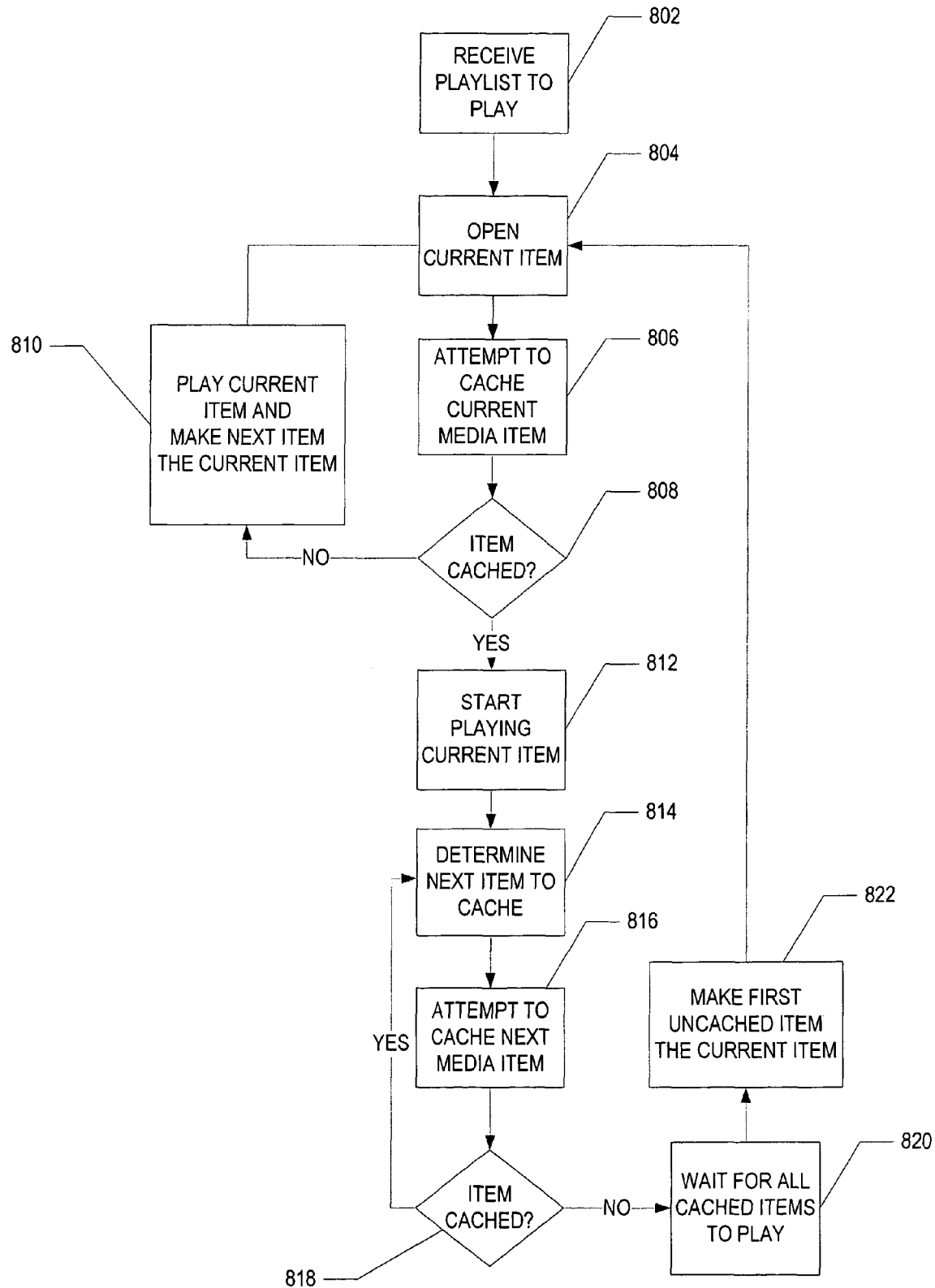
FIG. 8 is an exemplary flow chart illustrating for caching media in a cache memory of a portable multifunction computing device according to one exemplary embodiment of the invention.

Referring now to FIG. 8 an exemplary flow chart illustrates a method for processing a playlist of media files from the cache memory of a device according to one exemplary embodiment of the invention. At 802, the caching application receives input from a user of the device to begin playback of media items (e.g., media files) included in the playlist. The caching application opens the current item in the playlist at 804. For example, the caching application opens the first media item in the playlist. At 806, the caching application attempts to cache the current media file (i.e., the first media file). If the current media file is not cached at 808, the caching application plays the current item and makes the next media file in the playlist (e.g., the second media file) the current media file at 810 and opens the current item in the playlist at 804. If the current media file is cached at 808, the caching application begins playing the current item at 812. At 814, the caching application determines the next media file in the playlist to cache. The caching application attempts to cache the next media file at 816. If the next media file is not cached at 818, the caching application waits for all cached items to complete playback at 820. At 822 the caching application makes the first uncached media file in the playlist the current media file and opens the current media file at 804. If the next media file is cached at 818, the caching application determines the next media file in the playlist to cache at 814. The process continues until the next media item can no longer be determined.

Figure 9:
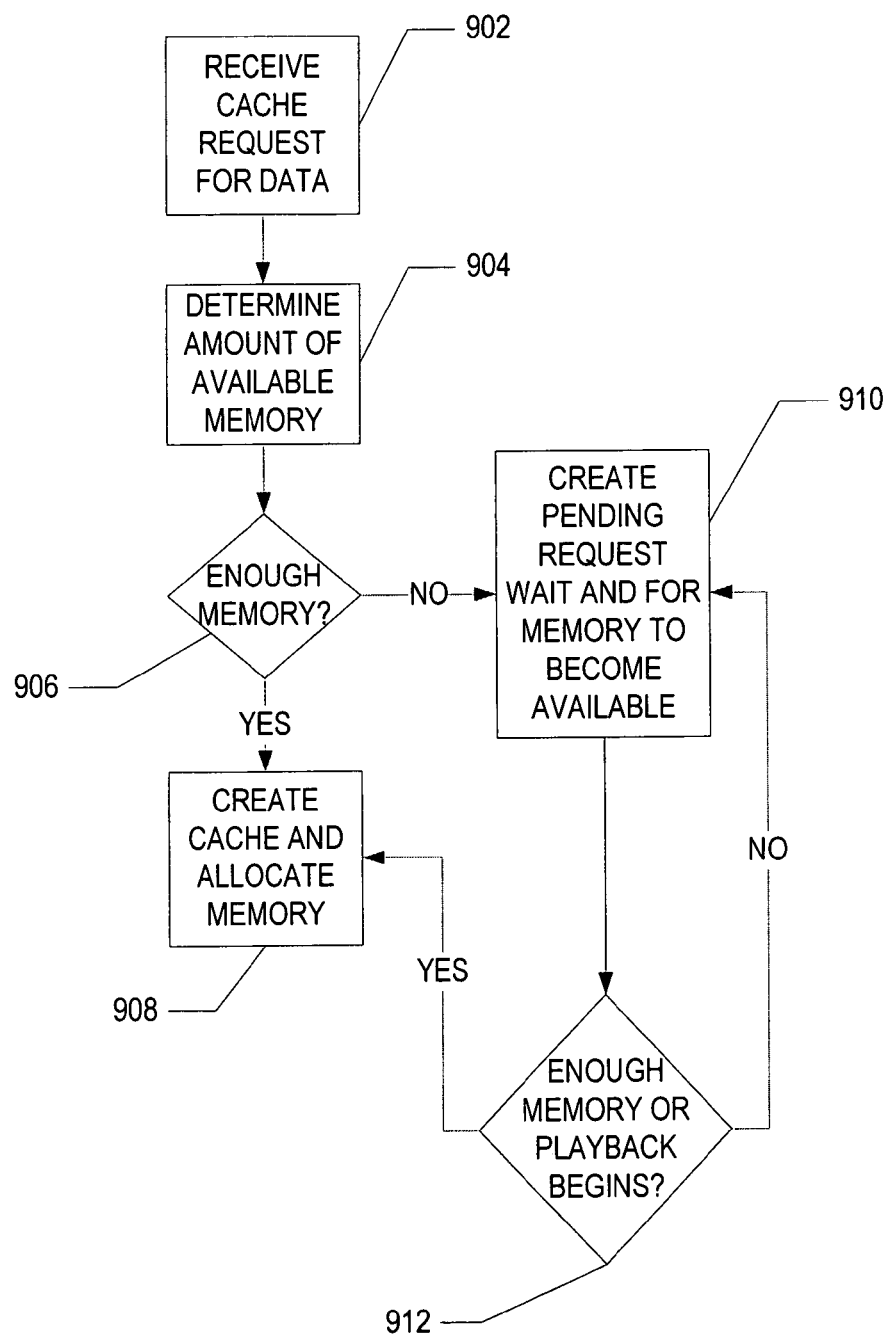
FIG. 9 is an exemplary flow chart illustrating a method for processing a playlist of media files from the cache memory of a portable multifunction computing device according to one exemplary embodiment of the invention.

Referring now to FIG. 9, an exemplary flow chart illustrates a method for caching a piece of media in a cache memory of a device according to one exemplary embodiment of the invention. At 902, a caching application determines that it has data to cache. For example, the user begins playback of a sequence of tracks and the first item in the playback is being prepared for playback. The caching application determines the amount of cache memory available at 904. At 906, the caching application determines if there is enough cache memory available to store the data associated the media file. If the caching application determines there is enough memory available at 906, the caching application creates a media cache with the correct number of segments to hold the contents of the media file and allocates memory for those segments at 908. If the caching application determines there is not enough memory available at 906, the caching application generates a pending cache request at 910. At 912, the caching application is responsive to the pending storage request to periodically determine if there is enough cache memory available to store the data associated with the media file or if playback for the specified media file has begun. When the caching application determines that the item must be cached at 912, the caching application creates a media cache with the correct number of segments and allocates memory for those segments to fill with data from the media file at 908.

Figure 10:
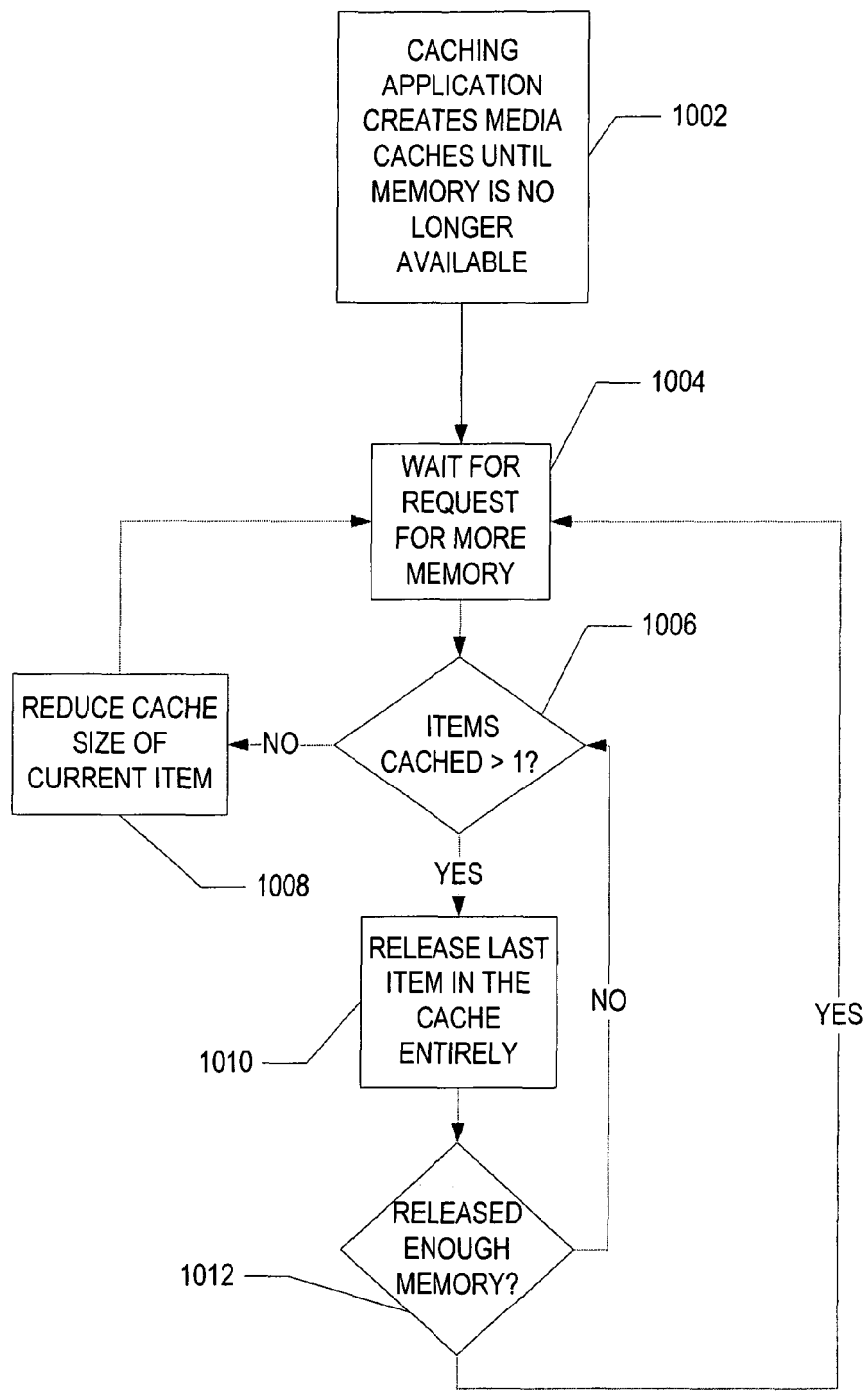
FIG. 10 is an exemplary flow chart illustrating a method for responding to low memory conditions in a portable multifunction computing device processing cache request according to one exemplary embodiment of the invention.

Referring now to FIG. 10, an exemplary flow chart illustrates a method for responding to low memory conditions in a device managing media caches according to one exemplary embodiment of the invention. The caching application begins by caching all media files until cache memory is no longer available at 1002. The caching application waits for a memory event informing the caching application that the system needs more memory at 1004. At 1006, the caching application is responsive to the memory event to determine if data associated with more than one media file to be processed on the device is currently stored in cache memory. If the caching application determines that data associated with only one item is currently stored in cache memory at 1006, the cache size of the current item is reduced at 1008. For example, if the data is associated with a media file, the number of segments allocated to the media cache is reduced causing the size of the media cache to reduce. If available content that has already been played is removed from the cache, otherwise content that has yet to be played and is found at the end of the cache is removed. If the caching application determines that data associated with more than one media item is currently stored in cache memory at 1006, the data associated with the last media item stored last in the media cache is removed at 1010. At 1012, the caching application determines if it has released enough memory to respond to the request from the operating system at 1012. If the caching application determines that there is not enough storage space removed from the cache at 1012, the caching application again determines if more than one item is stored in the media cache at 1006. If the caching application determines there is enough storage space has been released to fulfill the request at 1012 the caching application return to 1004 to wait for a request for additional memory.

In operation, computer 130 executes computer-executable instructions such as those illustrated in the FIGS. 8-10 to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method of managing system memory for optimizing performance of a portable computing device, said method comprising:
   receiving a cache creation request from an application being executed by the portable computing device, wherein the application specifies, in said received cache creation request, data to be cached in a memory area of the system memory;
   receiving a memory usage event from one or more different applications being executed by the portable computing device, said memory usage event specifying a current memory state of the portable computing device and indicating whether additional memory is required by the one or more different applications to perform their operations;
   determining, based on the cache creation request and the memory usage event, whether the portable computing device has sufficient available memory for caching the data specified in the cache creation request;
   when the determining indicates the portable computing device has sufficient available memory for caching the specified data:
      defining the memory area of the system memory of a portable computing device to be used for caching the specified data during execution of the application, said memory area comprising a plurality of memory segments, said memory segments each having a storage capacity available for caching;
      allocating one or more of the memory segments for caching the specified data to be cached;
      storing the specified data to be cached in the one or more allocated memory segments; and
      retrieving the cached specified data from the one or more allocated memory segments for processing by the application; and
   when the determining indicates the portable computing device does not have sufficient available memory for caching the specified data:
      generating a pending cache creation request for the particular specified data specified in the received cache creation request and thereafter holding the pending cache creation request until the portable computing device has sufficient memory for caching the particular specified data;
      in response to generating the pending cache creation request, monitoring the available memory of the portable computing device;
   when the monitoring indicates the portable computing device has sufficient available memory for caching the specified data:
      defining a memory area of the system memory of a portable computing device used for caching the particular specified data in the held cache creation request during execution of the application, said memory area comprising a plurality of memory segments, said memory segments each having a storage capacity available for caching;
      allocating one or more of the memory segments for caching the particular specified data to be cached;
      storing the particular specified data to be cached in the one or more allocated memory segments; and
      retrieving the cached particular specified data from the one or more memory segments for processing by the application.

2. The method of claim 1, wherein the received memory usage event is one or more of the following:
   a memory need event indicating that the device has reached a state in which requests for large amounts of memory may no longer be fulfilled because system memory is not available;
   a memory full event indicating that the amount of available system memory is not generally sufficient for standard operation; and
   a memory critical event indicating the amount of available system memory is below a critical threshold level.

3. The method of claim 1, further including adjusting the memory area available for caching, wherein said adjusting includes:
   allocating a portion of the memory area back to the system memory of the device when at least two of the plurality of segments are allocated for caching the data specified by the cache creation request; or
   allocating a portion of the memory area back to the system memory of the device when only one of the plurality of segments is allocated for caching the data specified by the cache creation request.

4. The method of claim 1, wherein the storage capacity of each of the plurality of segments is fixed, and wherein the number of segments in the plurality of segments is determined by the amount of system memory requested by the cache creation request.

5. The method of claim 4, wherein the allocating includes allocating a different one or more of the segments for caching the different data specified by the cache creation request when the determining indicates the portable computing device has sufficient available system memory available for caching the different data.

6. The method of claim 4 further comprising identifying one or more of the plurality of segments caching data specified by the cache creation request that is not currently being processed by the application, and reallocating the identified one or more of the segments for caching the different data specified by a subsequent cache creation request when the determining indicates the portable computing device has sufficient available system memory available for caching the different data.

7. The method of claim 1 further comprising monitoring the plurality of segments to identify one or more of the plurality of segments caching the data that has been processed by the application, and removing the processed data from the identified one or more segments.

8. One or more computer-readable storage media having computer executable components executed by a portable computing device for optimizing performance of the portable computing device, said computer-readable storage media comprising:
a defining component for defining a memory area of the system memory of the portable computing device for caching data during execution of an application, said memory area comprising a plurality of memory segments, said memory segments each having a predetermined storage capacity available for caching;
an event receiver component for receiving a memory usage event from one or more different applications being executed by the portable computing device, said memory usage event specifying a current memory state of the portable computing device and indicating whether additional memory is required by the one or more different applications to perform their operations;
a cache management component for receiving a cache creation request from an application being executed by the portable computing device, wherein the application specifies, in said received cache creation request, data to be cached in the memory area of the system memory, and said cache management component determining, based on the received cache creation request and the memory usage event, whether the portable computing device has sufficient available memory for caching the specified data, wherein the cache management component is further configured for generating a pending cache creation request for the specified data when the cache management component indicates the portable computing device does not have sufficient available memory for caching the specified data and thereafter holding the pending cache creation request until the portable computing device has sufficient memory for caching the specified data; and
a consumption component for allocating one or more of the memory segments for caching the specified data when the portable computing device is determined to have sufficient available memory for caching the data specified by the received cache request, and said consumption component storing the specified data to be cached in the one or more allocated memory segments.

9. The computer-readable storage media of claim 8, wherein the cache management component is configured for receiving a subsequent cache creation request, said subsequent cache creation request specifying different data to be cached in a different memory area, and wherein the cache management component is further configured for determining, based on the received subsequent cache creation request, whether the portable computing device has sufficient available system memory available for caching the different specified data.

10. The computer-readable storage media of claim 9, wherein the consumption component is configured for allocating a different one or more of the memory segments for caching the different specified data when the cache management component indicates the portable computing device has sufficient available system memory available for caching the different specified data.

11. The computer-readable storage media of storage claim 9, wherein the consumption component is further configured for:
retrieving cached data from the one or more memory segments for processing by the application;
identifying one or more of the plurality of memory segments caching data that is not currently being processed by the application; and
reallocating the identified one or more of the memory segments for caching the different specified data when the determining indicates the portable computing device has sufficient available system memory available for caching the different specified data.

12. The computer-readable storage media of claim 11, wherein the consumption component is further configured for monitoring the plurality of memory segments to identify one or more of the plurality of memory segments caching data that has been processed by the application and removing the processed data from the identified one or more memory segments.

13. The computer-readable storage media of claim 8, wherein the cache management component is further configured for:
in response to generating the pending cache creation request, monitoring the available system memory of the portable computing device;
when the monitoring indicates the portable computing device has sufficient available system memory for caching the specified data:
defining the memory area of the system area of the portable computing device used for caching the specified data in the held cache creation request during execution of the application, said memory area comprising a plurality of memory segments, said memory segments each having a storage capacity available for caching;
allocating one or more of the memory segments for caching the specified data to be cached;
storing the specified data to be cached in the one or more allocated memory segments; and
retrieving cached specified data from the one or more memory segments for processing by the application.

14. A portable computing device comprising:
a user interface, associated with an application of the portable computing device, for generating a cache creation request, wherein the application specifies, in said cache creation request, data to be cached in a memory area of a system memory;
a processor, associated with the portable computing device, for executing computer-executable instructions stored on computer-readable storage media, said computer-executable instructions comprising computer-executable instructions for:
partitioning the memory area of the system memory of the portable computing device into a caching memory portion for caching during execution of the application and into a reserve memory portion and a critical memory portion, said caching memory portion comprising a plurality of memory segments, said memory segments each having a predetermined storage capacity available for caching, said reserve memory portion having a predetermined storage capacity available for additional caching and said critical memory portion having a predetermined storage capacity available for supporting an operating system executing on the portable computing device;

receiving a cache creation request from the application, wherein the application specifies, in said received cache creation request, data to be cached in a memory area of the system memory;

receiving a memory usage event from one or more different applications being executed by the portable computing device, said memory usage event specifying a current memory state of the portable computing device and indicating whether additional memory is required by the one or more different applications to perform their operations;

determining, based on the cache request and the memory usage event, whether the portable computing device has sufficient available system memory for caching the specified data before allocating the one or more memory segments for caching;

generating a pending cache creation request for the specified data when the computing device is determined to not have sufficient available system memory for caching the specified data and thereafter holding the pending cache creation request until the portable computing device has sufficient available memory for caching the specified data;

allocating one or more of the memory segments for caching the specified data when the computing device is determined to have sufficient available system memory for caching the data specified by the cache request;

storing the specified data to be cached in the one or more allocated memory segments;

retrieving cached data from the one or more allocated memory segments for processing by the application;

monitoring a plurality of segments to identify one or more of the plurality of segments caching data that has been processed by the application; and removing the processed data from the identified one or more segments.

15. The device of claim 14, wherein at least a portion of the storage capacity of the reserve memory portion is allocated to the critical memory portion during a memory critical event.

16. The portable computing device of claim 14, wherein the computer-executable instructions further comprise instructions for:

holding the pending cache creation request until the portable computing device has sufficient system memory for caching the specified data;

in response to generating a pending cache creation request, monitoring the available system memory of the portable computing device;

when the monitoring indicates the portable computing device has sufficient available system memory for caching the specified data:

defining the memory area of the system memory of the portable computing device used for caching the specified data in the held cache creation request during execution of the application, said memory area comprising a plurality of memory segments, said memory segments each having a storage capacity available for caching;

allocating one or more of the memory segments for caching the specified data to be cached;

storing the specified data to be cached in the one or more allocated memory segments; and retrieving cached specified data from the one or more memory segments for processing by the application.

* * * * *